US011933923B2

United States Patent
Tinti et al.

(10) Patent No.: US 11,933,923 B2
(45) Date of Patent: Mar. 19, 2024

(54) DUAL MODE DETECTOR

(71) Applicant: Paul Scherrer Institut, Villigen PSI (CH)

(72) Inventors: Gemma Tinti, Zurich (CH); Xintian Shi, Hauterive (CH); Roberto Dinapoli, Brugg (CH); Bernd Schmitt, Lauchringen (CH); Aldo Mozzanica, Windisch (CH)

(73) Assignee: Paul Scherrer Institut, PSI Villigen (CH)

( * ) Notice: Subject to any disclaimer, the term of this patent is extended or adjusted under 35 U.S.C. 154(b) by 3 days.

(21) Appl. No.: 17/767,136

(22) PCT Filed: Sep. 28, 2020

(86) PCT No.: PCT/EP2020/077037
§ 371 (c)(1),
(2) Date: Apr. 7, 2022

(87) PCT Pub. No.: WO2021/069243
PCT Pub. Date: Apr. 15, 2021

(65) Prior Publication Data
US 2022/0373700 A1 Nov. 24, 2022

(30) Foreign Application Priority Data
Oct. 7, 2019 (EP) .................................... 19201620

(51) Int. Cl.
*G01T 1/17* (2006.01)
*G01T 1/24* (2006.01)
(52) U.S. Cl.
CPC ................ *G01T 1/17* (2013.01); *G01T 1/247* (2013.01)
(58) Field of Classification Search
CPC .......... G01T 1/17; G01T 1/247; G01T 1/1606
See application file for complete search history.

(56) References Cited

U.S. PATENT DOCUMENTS

| 4,893,015 A * | 1/1990 | Kubierschky ........... G01T 1/208 250/362 |
| 2008/0099689 A1* | 5/2008 | Nygard ..................... G01T 1/17 250/370.09 |
| 2014/0166861 A1* | 6/2014 | Schmitt ................ H04N 25/772 250/208.2 |

FOREIGN PATENT DOCUMENTS

EP 1581971 B1 5/2009

OTHER PUBLICATIONS

Mozzanica A. et al.; "Mythen II: A 128 channel single photon counting readout chip"; Nuclear Instruments & Methods in Physics Research; vo.: 607; No. 1; pp. 250-252; XP026321000; ISSN: 0168-9002; DOI: 10.1016/J.NIMA.2009.03.166; 2009.

(Continued)

*Primary Examiner* — Thanh Luu
*Assistant Examiner* — Monica T Taba
(74) *Attorney, Agent, or Firm* — Laurence A. Greenberg; Werner H. Stemer; Ralph E. Locher

(57) ABSTRACT

A detector system which can be switched between single photon counting and charge integrating mode depending on the application, the photon flux and energy. Although the space for electronics in a pixel or strip detector system is very limited (as each channel is limited by the pixel size), the reconfiguration of the analog chain and the logic/counter in this smart way yields to have a detector system allowing both modes of operation and, therefore, effectively combining the characteristics of an Eiger® single photon counting system and a Jungfrau® charge integrating pixel detector system into one single detector. Depending on the application, the flux and the photon energy, the operator is enabled to switch between single photon counting and charge integrating mode of operation.

6 Claims, 8 Drawing Sheets

(56) References Cited

OTHER PUBLICATIONS

Aschkan Allahgholi et al: "The Adaptive Gain Integrating Pixel Detector at the European XFEL"; Journal of Synchrotron Radiation; vol. 26, No. 1; Nov. 13, 2018; pp. 74-82; XP55754661; DOI: 10.1107/S1600577518016077.

Mezza D et al: "Characterization of AGIPD1.0: The full scale chip"; Nuclear Instruments & Methods in Physics Research; Section A; Elsevier BV; North-Holland; NL; vol. 838, Sep. 4, 2016; pp. 39-46; XP029764357; ISSN: 0168-9002; DOI: 10.1016/J.NIMA.2016.09.007.

Marie Andrä et al.; "Development of low-energy X-ray detectors using LGAD sensors"; Journal of Synchrotron Radiation; vol. 26; No. 4; pp. 1226-1237; XP55677133; ISSN: 1600-5775; DOI: 10.1107/S1600577519005393; 2019.

Zhang Jiaguo et al.; "Performance Evaluation of the Analogue Front-End and AOC Prototypes for the Gotthard-II Development"; arxiv.org; XP081308236; DOI: 10.1088/1748-0221/12/12/C12052; 2017.

Paternoster G. et al.:; "Developments and first measurements of Ultra-Fast Silicon Detectors produced at FBK"; Journal of Instrumentation; vol. 12; No. 02; pp. C02077-C02077; XP55677497; DOI: 10.1088/1748-0221/12/02/C02077; 2017.

Andrä, M. et al: "Towards Mythen III—prototype characterisation of MYTHEN III.0.2"; Journal of Instrumentation; vol. 14, No. 11; Nov. 26, 2019; pp. C11028-C11028; XP55754468; DOI: 10.1088/1748-0221/14/11/C11028.

Jiaguo Zhang et al: "Towards Gotthard-II: Development of a Silicon MicrostripD etector for the European X-ray Free-Electron Laser"; arxiv.org; XP081300705; DOI: 10.1088/1748-0221/13/01/P01025; 2017.

Allahgholi ,Aschkan et al: "Megapixels @ Megahertz—The AGIPD high-speed cameras for the European XFEL"; Nuclear Instruments & Methods in Physics Research; Section A; Elsevier BV; North-Holland; NL; vol. 942, Jul. 2, 2019; XP085765852; ISSN: 0168-9002; DOI: 10.1016/J.NIMA.2019.06.065.

\* cited by examiner

DUAL MODE DETECTOR

FIELD AND BACKGROUND OF THE INVENTION

The present invention relates to a readout chip (strip and pixel) and a detector system for photon detection in photon science applications.

Currently the requirements for photon science detectors in terms of pixel size, covered detector area, detection efficiency, dynamic range and readout speed are best covered with direct detection hybrid detector systems having semiconductor sensors with flip-chip (bump) bonded readout chips. For the readout chips the main architectures are: single photon counting and charge integrating resulting up to now in separate and independent detector systems.

At a measurement setup (end station of a beamline) the requirements on the detector can change dramatically from experiment to experiment causing a huge variation in photon rates from a few photons per pixel in ten seconds up to photon rates of several MHz per pixel. Also the necessity to measure a fraction of the charge generated by a photon to enhance the position resolution by interpolation might be required. The later can only be achieved by charge integrating systems with small pixels.

Therefore currently beamlines often require several detectors systems (single photon counting and charge integrating) to cover the entire range of applications.

Single photon counting (SPC) detectors and readout chips (for example see EP 1 581 971 B1) are very well established and easy to use (Pilatus®, Eiger® and Mythen®, developed at Paul Scherrer Institut and registered trademarks of Dectris Ltd., Switzerland). However, they have count rate limitations at high photon rates (about 1 MHz per channel) due to analogue pile up in the pre-amplifier. For low fluxes, however they are currently the preferred choice since they are easy to use and easy to calibrate. Due to the minimal settable comparator threshold single photon counting detectors are also limited to a smallest photon energy of about 2-3 keV. In addition they do not provide a measurement of the photon charge and therefore do not allow to enhance the position resolution by interpolation for single photons.

Charge integrating (CI) detectors like Jungfrau®, Mönch® and Gotthard® from Paul Scherrer Institut, Switzerland, overcome these limitations. However, their usage is more complex since intensive data processing has to be performed, in particular since they have to be used with short integration times and correspondingly high frame rates to achieve a full duty cycle.

A further challenge in the design of single photon counting detectors and charge integrating detectors is present in terms of the limited space for the on-chip electronics of the respective detectors. Keeping in mind that the spatial resolution is key in synchrotron measurements, such as macro-molecular-crystallographic investigations, an acceptable pixel size for a pixel detector has to be roughly in the range of 50 μm×50 μm. Detectors also have to cover a large active area with many megapixels. The electrical power per pixel is therefore very limited to be able to keep the detector at stable temperatures required for a stable and well calibrated operation.

Furthermore, the large variety of photon science applications require to a non-negligible extent a certain flexibility on whether single photon counting capabilities or charge integrating capabilities of the detector system is required.

SUMMARY OF THE INVENTION

Therefore, it is the objective of the present invention to provide a detector system comprising a readout chip that can be used both in single photon counting and charge integrating mode thereby also satisfying the very limited space and power availability in order to allow very small dimensions for the single channel (pixel or strip).

This objective is achieved according to the present invention by a dual mode detector system for photon detection that is operated either in single photon counting mode or in charge integrating mode, comprising in its basic configuration:

a) a layer of photosensitive material;
b) an N×M array of photo-detector diodes arranged in said layer of photosensitive material; each of said photo-detector diodes having a bias potential interface and a diode output interface, said bias potential interface of each photo-detector diode being connected to a bias potential;
c) a N×M array of high gain, low noise readout unit cells, one readout unit cell for each photo-detector diode; and
d) each readout unit cell comprising:
  d1) an input interface connecting said diode output interface to a high-gain charge-to-voltage amplifier;
  d2) said high-gain charge-to-voltage amplifier having a feedback network between input and output comprising:
    d21) a number of feedback capacitors (C1-C3) which can be switched in or out from said feedback network;
    d22) a fixed or controllable feedback resistance, using a preamp voltage, which can be switched in or out from said feedback network, needed in single photon counting mode;
    d23) a preamp reset switch, needed to reset the feedback capacitors to a voltage of zero between their terminals in charge integrating mode;
  d3) said high-gain charge-to-voltage amplifier being connected to a shaper/CDS having a feedback network between input and output; said shaper amplifies and reduces the noise content of the signal coming from the preamplifier in photon counting mode, and acts as a correlated double sampling stage in charge integrating mode;
  d4) said shaper further having a feedback network between input and output, comprising:
    d41) a number of feedback capacitors which can be switched in or out from said feedback network;
    d42) a fixed or controllable feedback resistance, needed in single photon counting mode, using a shaper voltage (Vsh), which can be switched in or out from the feedback network;
    d43) a CDS reset switch, needed to reset the feedback capacitors to a voltage of zero between their terminals in charge integrating mode,
  d5) a discriminator receiving as an input the output voltage of the high-gain charge-to-voltage amplifier in charge integrating mode and the output of the shaper in single photon counting mode, thus detecting if the preamplifier reaches saturation in charge integrating mode or if a photon was impinging on the photo detector diode in single photon counting mode;
  d6) a counter connected to said discriminator in single photon counting mode, needed to count the number of photons;
  d7) a number of switches (sw1-sw6), said switches being controlled to enable the use of the high-gain charge-to-voltage amplifier, the shaper and the discriminator in both modes;

d8) a control logic, connected to the output of the discriminator and to control signals coming from the chip periphery, generating the necessary steering signals for the preamplifier feedback network; in charge integrating mode said control logic would controls the preamp and CDS resets and automatically changes the gain of the preamplifier, switching in or out feedback capacitors depending on the output of the discriminator; and said control logic also being enabled to generate the necessary signals to store in the latches which gain was used, i.e. the gain bits; further, in single photon counting mode the control logic it is enabled to select different static gains by switching in or out the feedback capacitors depending on control signals coming from the chip periphery;

d9) a counter readout comprising the required digital circuitry needed to readout said counter;

d10) a gain bit readout, comprising the required digital circuitry to readout the latches for the gain bits;

d11) an analog readout, comprising the required analog circuitry needed to readout the voltage of said sample and hold circuit;

e) a channel readout architecture comprising:
  e1) one or more analog multiplexers being connected to the analog readout circuitry of all channels (RO) and which, according to the channel selection and MUX control signals, route the selected channels (RO) to one or more analog outputs;
  e2) one or more digital multiplexers being connected to the counter readout circuitry of all channels (RO) and which, according to the channel selection and MUX control signals, route the selected channels (RO) to one or more digital outputs;
  e3) one or more digital multiplexers being connected to the gain bits readout circuitry of all channels (RO) and which, according to the channel selection and MUX control signals, route the selected channels (RO) to one or more digital outputs.

Preferred embodiments of the present invention are listed in certain dependent claims.

This objective is also achieved according to the present invention by a dual mode detector system for photon detection that can be operated either in single photon counting mode or in charge integrating mode with or without gain switching, comprising:

a) a layer of photosensitive material;

b) an N×M array of photo-detector diodes arranged in said layer of photosensitive material; each of said photo-detector diodes having a bias potential interface and a diode output interface, said bias potential interface of each photo-detector diode being connected to a bias potential;

c) a N×M array of high gain, low noise readout unit cells, one readout unit cell for each photo-detector diode; and d) each readout unit cell comprising:
  d1) an input interface connecting said diode output interface to a high-gain charge-to-voltage amplifier;
  d2) said high-gain charge-to-voltage amplifier having a feedback network between input and output comprising:
    d21) a number of feedback capacitors which can be switched in or out from said feedback network;
    d22) a fixed or controllable feedback resistance, using a preamp voltage, which can be switched in or out from said feedback network, needed in single photon counting mode;
    d23) a preamp reset switch, needed to reset the feedback capacitors to a voltage of zero between their terminals in charge integrating mode;
  d3) said high-gain charge-to-voltage amplifier being connected to a shaper/CDS having a feedback network between input and output;
  d4) said shaper having a feedback network between input and output, comprising:
    d41) a number of feedback capacitors which can be switched in or out from said feedback network;
    d42) a fixed or controllable feedback resistance, needed in single photon counting mode, using a shaper voltage, which can be switched in or out from the feedback network;
    d43) a CDS reset switch, needed to reset the feedback capacitors to a voltage of zero between their terminals in charge integrating mode,
  d5) a discriminator trimming circuitry block, receiving as an input a set of trim bits and providing the needed adjustment biases to the discriminator to reduce channel to channel dispersion;
  d6) a discriminator receiving as an input the biases generated by the discriminator trimming circuitry, the output voltage of the high-gain charge-to-voltage amplifier in charge integrating mode and the output of the shaper in single photon counting mode, thus detecting if the preamplifier reached saturation in charge integrating mode or if a photon was impinging on the photo detector diode in single photon counting mode;
  d7) a counter connected to said discriminator in single photon counting mode, needed to count the number of photons;
  d8) a number of switches, said switches being controlled to enable the use of the high-gain charge-to-voltage amplifier, the shaper and the discriminator in both modes;
  d9) a channel status register (CSR) receiving control signals from the chip periphery, such that every channel status register can be loaded with specific values, and allows every channel to behave differently;
  d10) a control logic receiving input from the CSR and connected to the output of the discriminator and to control signals coming from the chip periphery, generating the necessary steering signals for the preamplifier feedback network, the shaper feedback network, the counter and the discriminator fine tuning;
  d11) a counter readout comprising the required digital circuitry needed to readout said counter;
  d12) an analog readout, comprising the required analog circuitry needed to readout the voltage of said sample and hold circuit; and e) a channel readout architecture comprising:
  e1) one or more analog multiplexers being connected to the analog readout circuitry of all channels and which, according to the channel selection and MUX control signals, route the selected channels to one or more analog outputs; and
  e2) one or more digital multiplexers being connected to the counter readout circuitry of all channels and which, according to the channel selection and MUX control signals, route the selected channels to one or more digital outputs.

Preferred embodiments of the present invention are listed in certain dependent claims.

Therefore, the present invention represents a detector system which can be switched either to single photon counting or to charge integrating mode depending on the application, the photon flux and the photon energy. Although the space for electronics in a pixel or strip detector system is very limited, the reconfiguration of the analogue chain and of the logic/counter in this smart way yields to have a detector system allowing both modes of operation in a small channel (pixel or strip). In case of a fixed gain charge integrating system the comparator is only used in single photon counting mode. The reconfiguration and reuse of components in both modes also minimizes the power consumption compared to implementing two independent branches for the two modes for each pixel or strip of the detector.

Preferred embodiments of the present invention are hereinafter described in more detail with reference to the attached drawings which depict in:

DETAILED DESCRIPTION OF THE INVENTION

Figure 1:
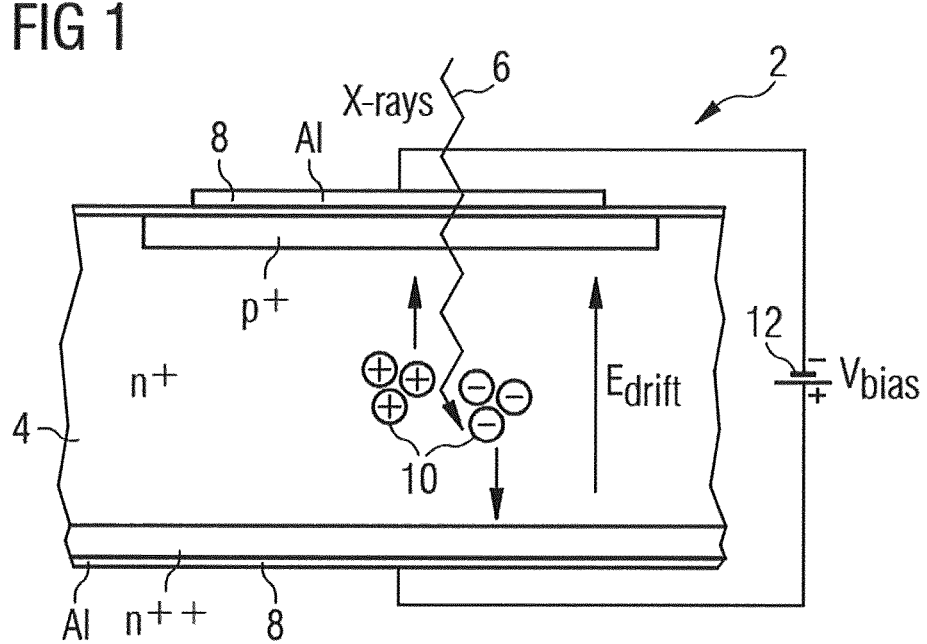
FIG. 1 a schematic view of the design of a photo-detector diode.

FIG. 1 illustrates schematically the architecture of a photo-detector diode 2 having a semiconductor trespassing section 4 with doping regions $p^+$, $n^+$, $n^{++}$ (referred to as semiconductor sensor). The most commonly used material is a silicon crystal but also germanium, gallium arsenide or cadmium (zinc) telluride can be used. In case of monolithic detector systems, the sensor is directly implemented in the same layer as the readout electronics 16.

An incident photon 6 having an energy in the range of few hundred eV to few hundred keV before entering the semiconductor sensor ($p^+$, $n^+$, $n^{++}$ trespassing section 4), passes through a possible cover layer (e.g. aluminum) 8 and causes according to its energy and to the energy needed to create an electron hole pair a respective number of electron hole pairs 10 after x-ray absorption. In the drawings, this number of electron hole pairs is exemplarily shown by three electron-hole pairs 10 being separated by the electrical field generated by a source of bias potential 12.

Figure 2:
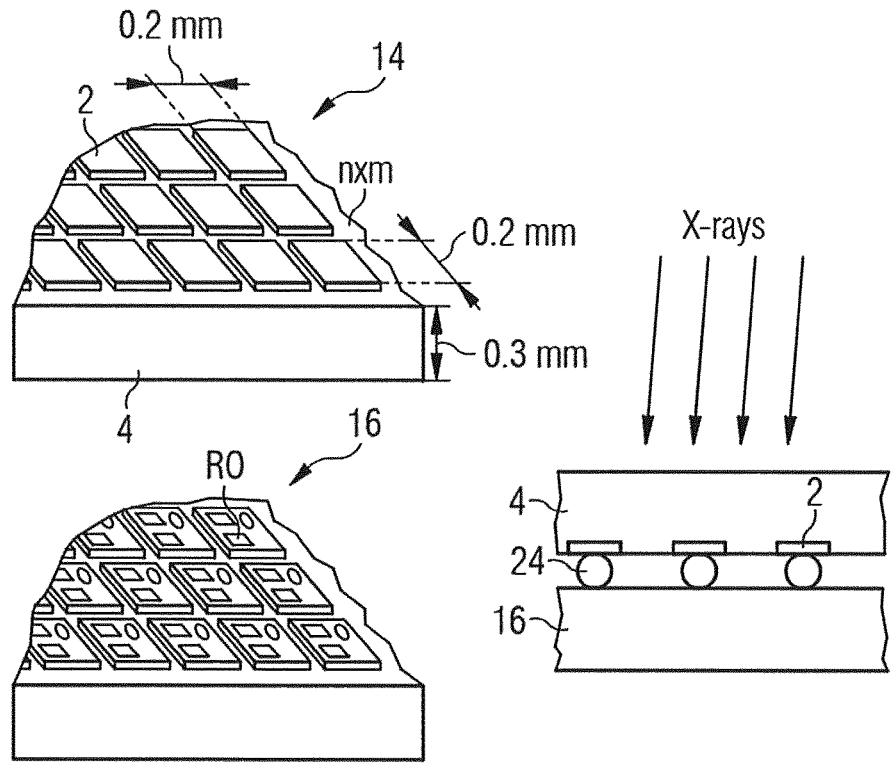
FIG. 2 a schematic view of a part of a detector module comprising an array of photo-detector diodes as one of them is shown in FIG. 1; note that the space for the electronics of each pixel in the readout chip is limited to the pixel size and is therefore very small (typically in the range from 20 to 200 μm×20 to 200 μm)

FIG. 2 shows a schematic view of a two-dimensional pixel sensor 14 having a number of photo-detector diodes 2 arranged in an array of N rows and M columns. The photo detector diodes 2 have a length l and a width w of about 10-500 μm and a height of about 20 μm to 2 mm. Below the plane of these photo-detector diodes 2 a readout chip 16 is disposed having a corresponding number of readout unit cells RO arranged for collecting the charge from the electron hole pairs 10 generated in the respective photo-detector diodes 2; each readout unit cell RO being allowed to cover not more space than the size of its corresponding photo-detector diode 2.

The electrical connection between a diode output interface of the photo-detector diodes 2 and an input interface IN of the readout unit cell RO is achieved by bump bonding using for example indium or solder bumps 24. In case of a one-dimensional detector (N or M equals 1) the connection between the diode output interface and the RO cell input interface can also be done with wire bonding. In case of monolithic detectors the sensor diodes are implemented in the readout chip directly and no bump bonding is necessary.

Figure 3:
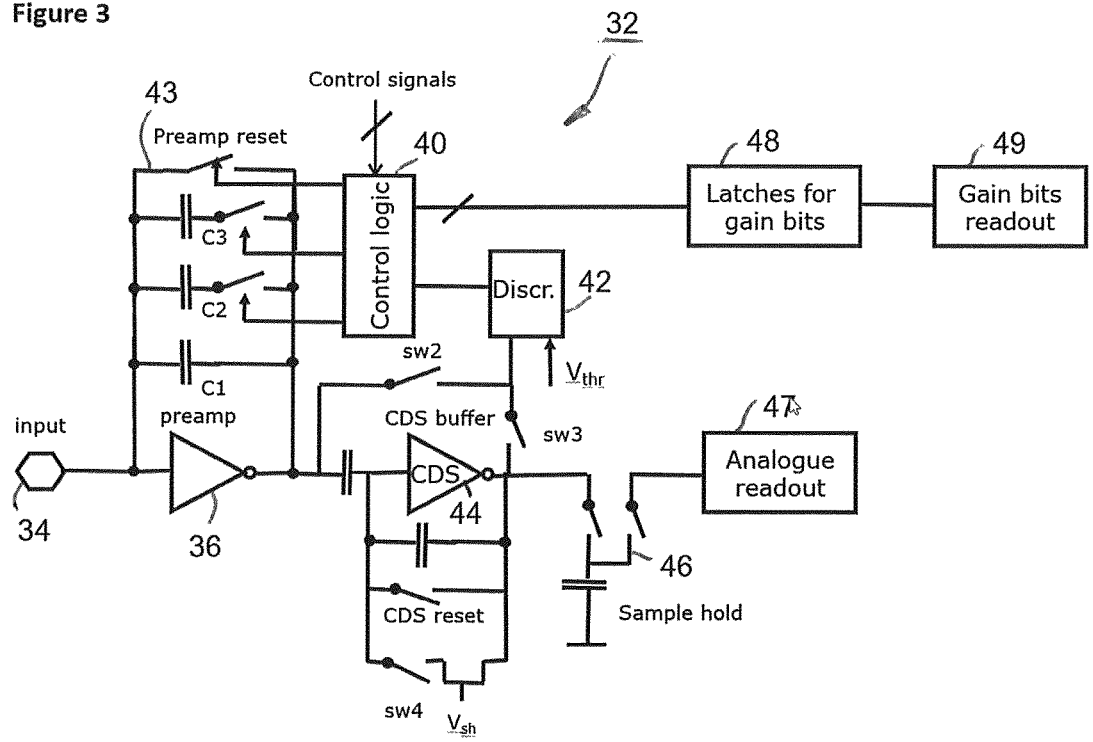
FIG. 3 schematically the circuitry for a charge integrating architecture with gain switching for a channel of a detector system comprising an array of channels.

FIG. 3 shows the implementation of a single channel 32 (a single readout unit cell) of a charge integrating detector with dynamic gain switching. Each channel 32 comprises a photosensitive semiconductor diode input 34 where an incident photon generates a number of electron hole pairs 10. This charge is amplified by a preamplifier 36 wherein the gain of the preamplifier 36 is determined by feedback capacitors C1 to C3. The feedback capacitor C1 has the lowest capacitance and the highest gain, C3 has the highest capacitance and the lowest gain. The feedback capacitors C1 to C3 and a reset 43 for the preamplifier 36 are controlled by a control logic 40. In case of a fixed gain charge integrating system only a single feedback capacitor is implemented.

A discriminator 42 compares the output of the preamplifier 36 with a threshold voltage $V_{thr}$ which is set such that the discriminator 42 switches just before the preamplifier 36 reaches saturation. The control logic 40 then connects the next larger capacitance C2 in the feedback, the output voltage drops, integration continues with a smaller gain and if it is again close to saturation a third capacitor C3 can be switched in. In this way, the preamplifier 36 is automatically adapted to the incoming number of photons and charge.

At the beginning of an acquisition cycle the preamplifier 36 with the feedback capacitors C1 to C3 and a CDS buffer 44 are reset by means of the control logic 40 which receives control signals from the chip periphery. Typically, first the preamp reset 43 and then the CDS reset are released. At the end of an acquisition cycle the analogue value is stored on a sample and hold circuit 46 comprising a sample capacitor C4 and is then switched to an analogue readout 47. The gain information detected by the control logic 40 (so to which gain the preamplifier 36 was switching) is stored in a set of latches for the gain bits 48 and can be readout through the gain bit readout 49.

Figure 8:
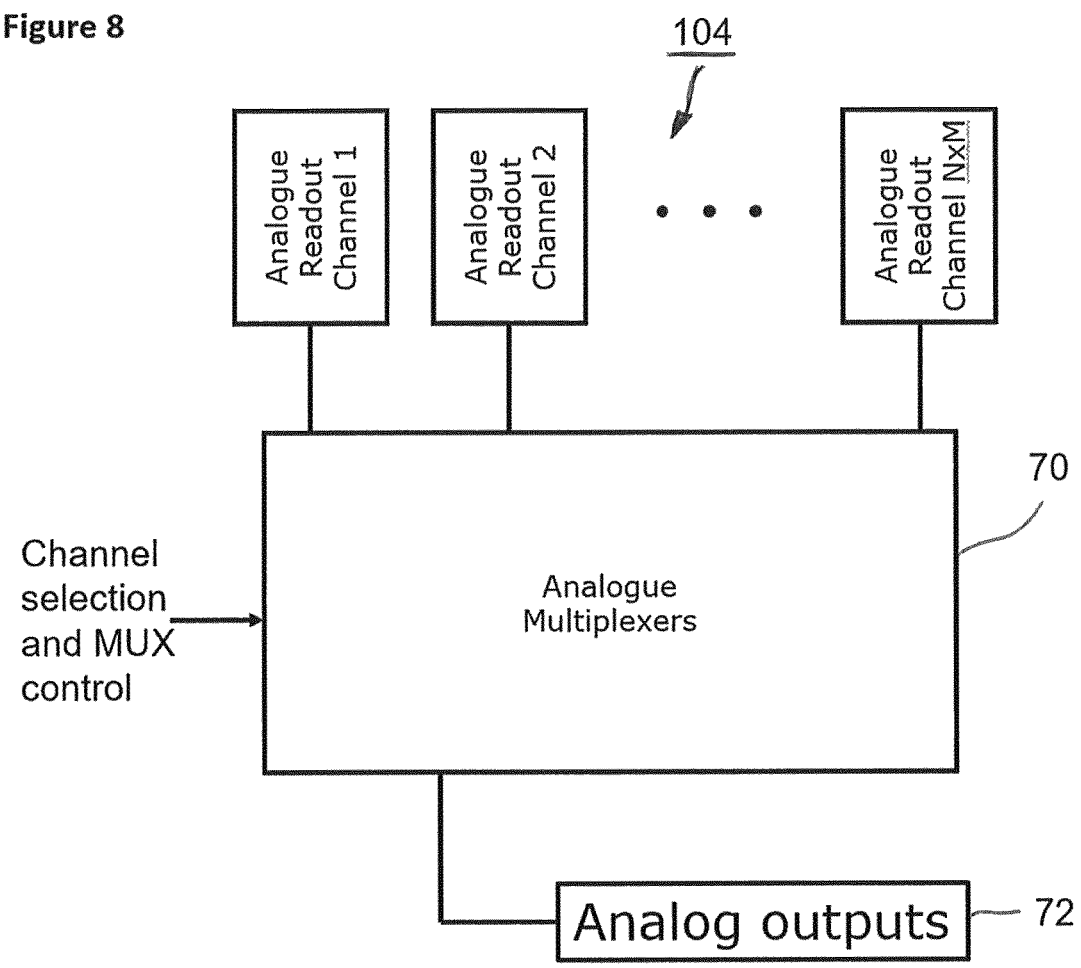
FIG. 8 schematically the circuitry for the readout of the analogue value of the entire channel matrix for a charge integrating system or the charge integrating mode of a dual mode system; there can be a multiple of multiplexers and a multiple of outputs to speed up the readout.

FIG. 8 shows a typical readout architecture 104 consisting of one or more analog multiplexers (MUX) which, by means of the channel selection and MUX control signals, send the voltage of the sample-and-hold capacitor of the selected channels to the chip analog output circuitry.

Figure 9:
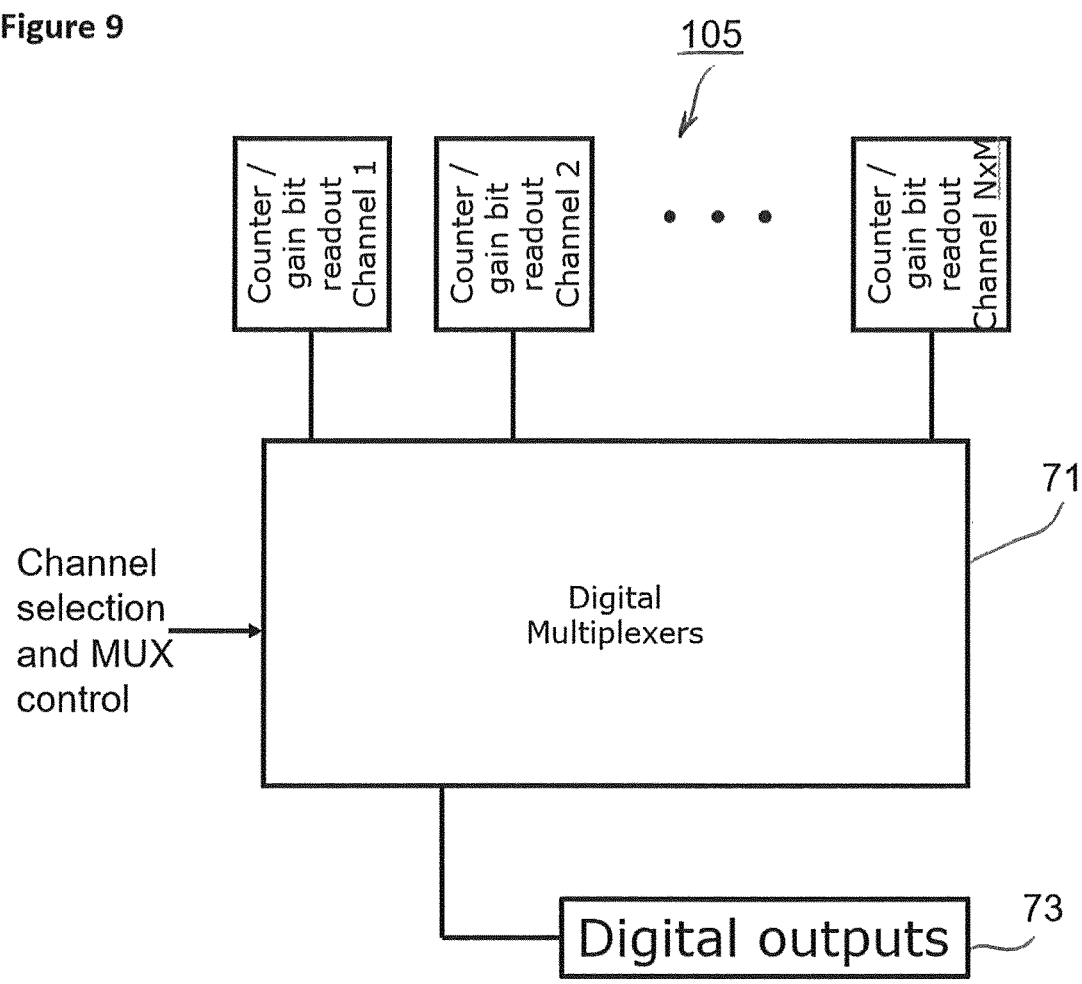
FIG. 9 schematically the circuitry for the readout of the digital values of the counters of the entire channel matrix of a single photon counting system or a dual mode system; this circuitry can also be used to read out the gain bits of a charge integrating or the dual mode system, further there can be a multiple of multiplexers and a multiple of outputs to speed up the readout.

FIG. 9 shows the additional digital readout architecture 105 needed to readout the gain bits of the channel array. It comprises one or more digital multiplexers MUX which, by means of the channel selection and MUX control signals, send the content of the gain bits of the selected channels to the chip digital output circuitry.

Figure 4:
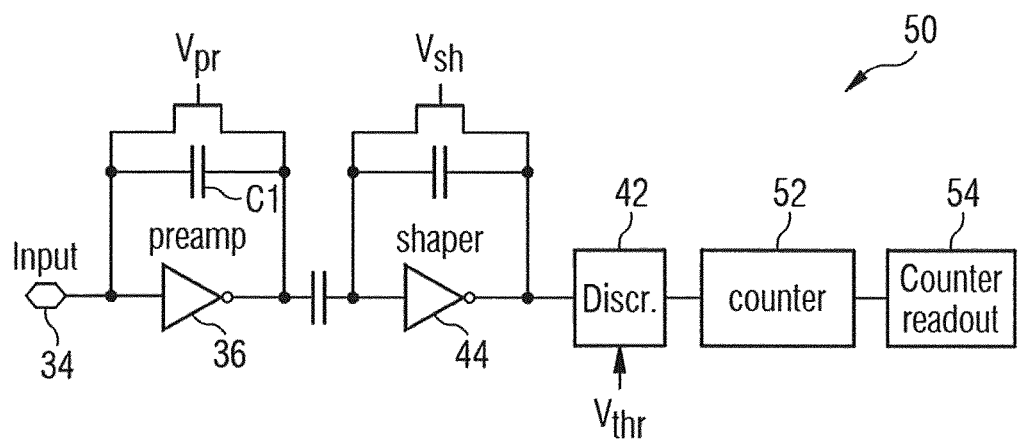
FIG. 4 schematically the circuitry for single photon counting for a channel of a detector system comprising an array of channels.

FIG. 4 shows a single channel of a typical single photon counting detector system 50. This figure represents a standard single photon counting architecture comprising the charge sensitive preamplifier 36 with the feedback capacitor C1 and a variable feedback resistance implemented in CMOS with a FET and a variable preset preamplifier voltage $V_{pr}$. The signal of the preamplifier 36 is amplified by a shaper 44. The discriminator 42 connected to the output of the shaper 44 has a threshold voltage $V_{thr}$ which corresponds to about 50% of the energy of a photon absorbed in the photosensitive semiconductor diode 2. If a photon arrives in a sensor pixel (detector channel) connected to the input of the preamplifier 36, then the signal will go above the threshold of the discriminator 42 and a counter 52 will be incremented accordingly. The count of the counter 52 is readout using a counter readout 54.

A typical readout architecture for single photon counting systems, is basically the same as presented in FIG. 9.

Presently (status of the art) the diode array is read out employing a front-end chip (also called application specific integrated circuit, ASIC). Depending on the application and its requirements, an ASIC implementing either a single photon counting architecture (SPC) or a charge integrating architecture (CI) is used resulting in two different detector systems.

Examples are the Eiger® single photon counting and the Jungfrau® charge integrating pixel detector systems (with a pixel size of 75 microns) from PSI. Therefore, depending on the application, one of the two detector systems is used. Since beamlines at synchrotrons cover a wide range of applications an exchange of the detector system might be necessary between different beamtimes and represents due to the complexity of the detector systems an error-prone operation and a loss of beamtime.

Figure 5:
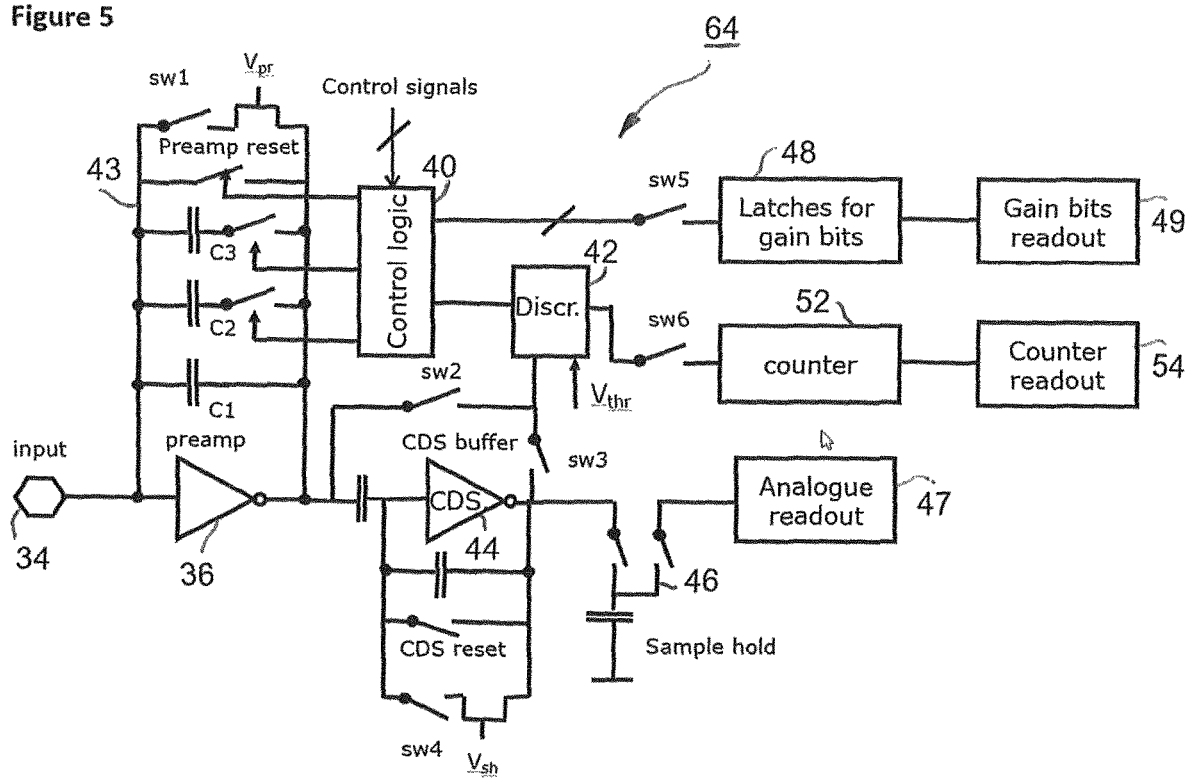
FIG. 5 schematically the circuitry for a channel of a detector system comprising an array of channels that can be switched between charge integrating mode with gain switching and single photon counting.

FIG. 5, described in more detail later on, shows the basic architecture of the present invention, representing a detector system 64 which can be switched between single photon counting and charge integrating mode depending on the application, the photon flux and energy. Although the space for electronics in a pixel or strip detector system is very limited (as each channel in the readout ASIC is limited by the pixel size), the reconfiguration of the analogue chain and the logic/counter in this smart way yields to have a detector system allowing both modes of operation and, therefore, effectively combining the Eiger and Jungfrau characteristics in one single detector. Depending on the application, the flux and the photon energy, the operator is enabled to switch between single photon counting and charge integrating mode of operation. The detector system based on the new channel architecture 64 could also allow the operation of one or more detector modules with a high photon flux in integrating mode (e.g. the central modules) and the other modules in single photon counting mode.

Realization

The key point is that several building blocks needed for single photon counting readout chips are also needed in charge integrating systems with gain switching. Therefore, it is intended to add the missing parts for single photon counting, such as the counter, and the variable feedback resistor, in the charge integrating readout chip. Further, several switches sw1 to sw6 (see FIG. 5) are added to change between the two modes. A specific control logic 40 is implemented to generate the necessary steering signals for the various channel blocks to work in both modes of operation.

FIG. 5 shows for a single channel an architecture of a dual mode detector system 64 which can be switched between both operation modes. For this purpose, a number of switches sw1 to sw6 are implemented in the readout unit cell which allows to operate each channel of an array of detector pixels in either single photon counting mode or charge integrating mode. The switches sw1 to sw6 are particularly used to allow the major components of the channel circuitry to be used in both modes (here the preamplifier 36, the feedback capacitor C1, the shaper/CDS buffer 44 and the discriminator 42). The other components are only used in their specific mode. To operate the dual mode detector system 64 in single photon counting mode, the switches sw1, sw3, sw4 and sw6 would be closed and sw2 and sw5 would be open. In the charge integrating mode, it would be inverse: the switches sw2 and sw5 would be closed while the switches sw1, sw3, sw4 and sw6 would be open. In this case an analog readout architecture (see FIG. 8, 104) and two digital readout architectures (see FIG. 9, 105) are needed.

Figure 10:
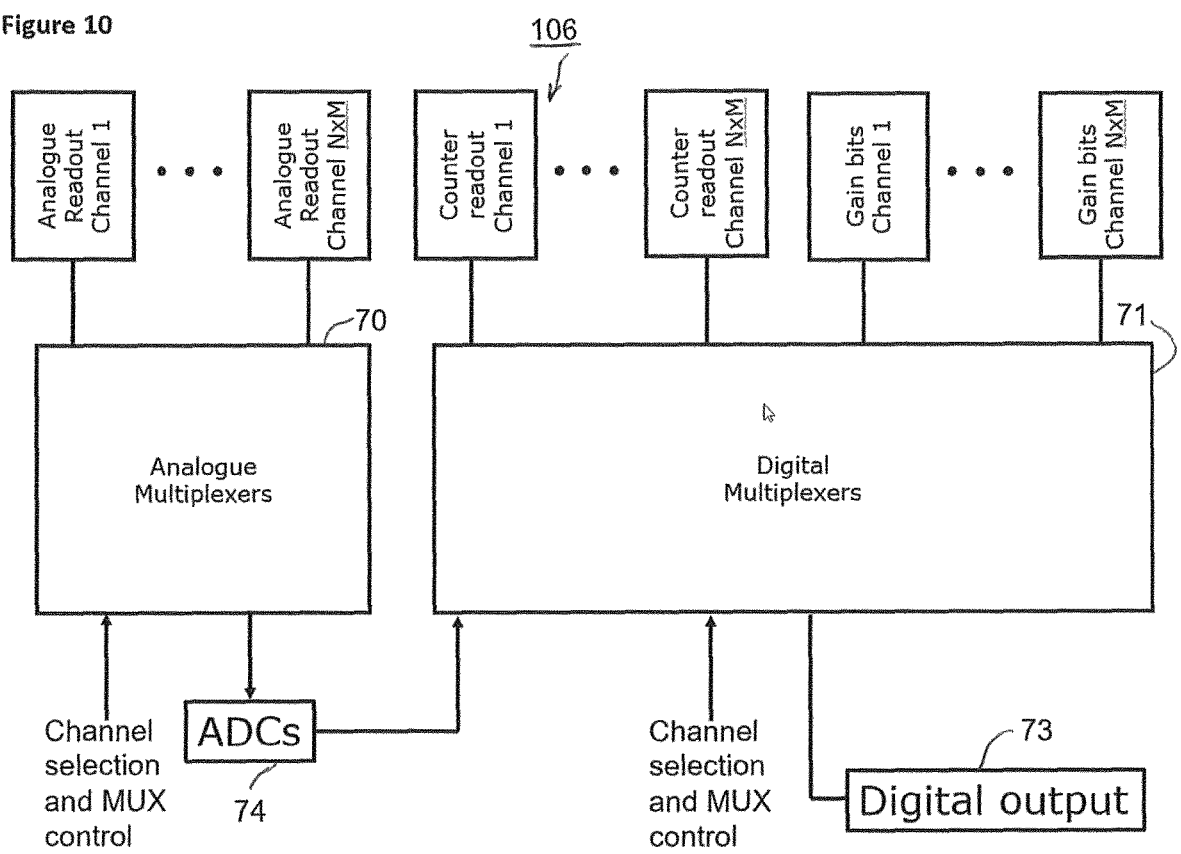
FIG. 10 schematically the circuitry for the readout of a dual mode detector system with an ADC in the periphery of the readout chip; there can also be a multiple of multiplexers and ADCs to speed up the readout.

FIG. 10 shows another embodiment of a readout architecture of a dual mode detector, wherein one or more analog to digital converters (ADC, 74) are added in the periphery of the chip. In this way, the analogue signals of the sample and hold stages 46 of the channel array are digitized on-chip and no analog off-chip outputs 72 are needed. The digital data of the ADC 74 can then preferably be transferred using the same digital outputs 73 as used in the single photon counting (SPC) mode. This allows using a simplified purely digital system for chip readout, in contrast to using a charge integrating (CI) system without on chip ADCs which requires a more complex readout system having itself ADCs. This architecture can be implemented to readout both the basic channel 64 and the more advanced one 84.

The use of most of the components in both modes allows simultaneously to minimize the space and the power consumption requirements that still have to be met when implementing the dual mode architecture for each channel of the dual mode detector system 64, 84. All the blocks which have to be used in both modes (e.g. preamplifier 36) have to be specifically designed to meet at the same time the different requirements needed when they have to be used in SPC mode or in CI mode.

Figure 6:
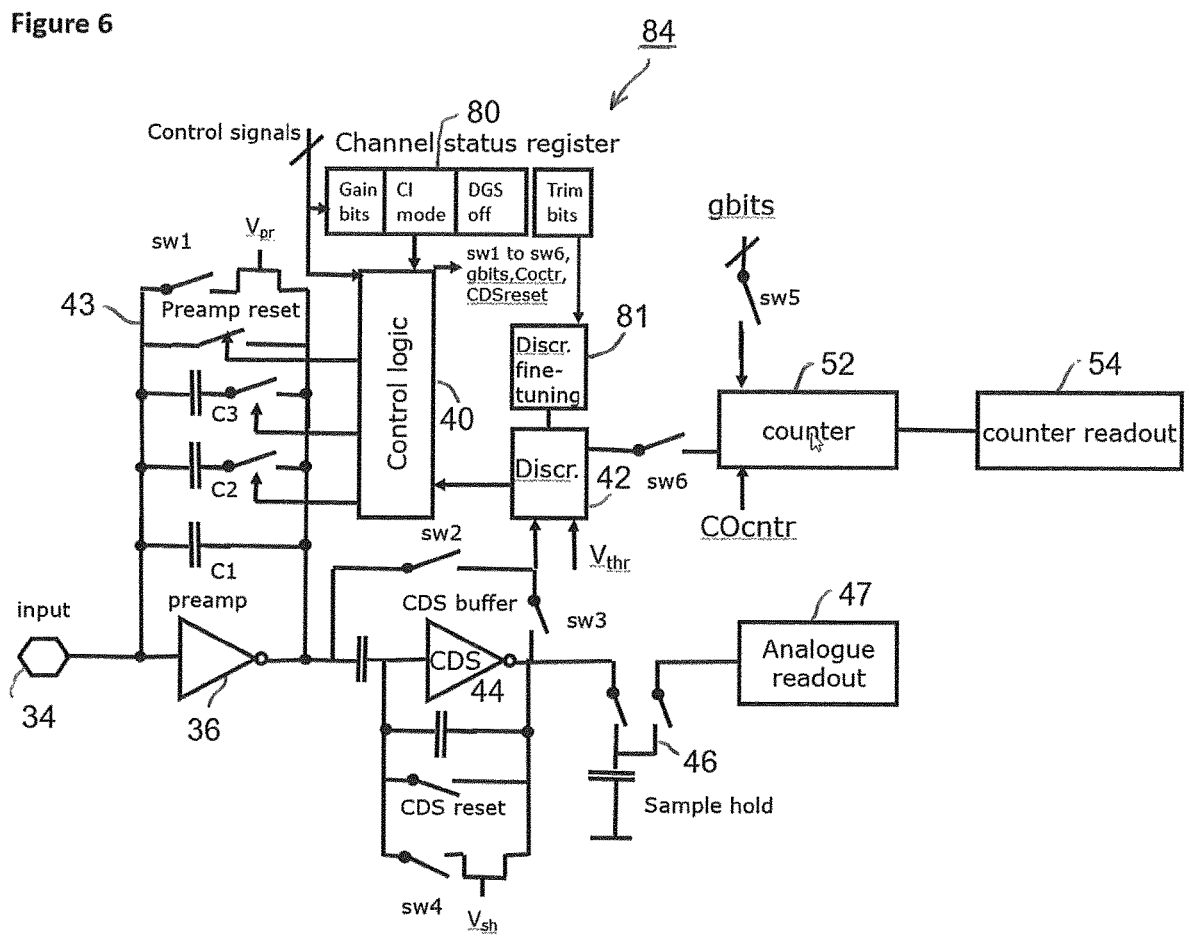
FIG. 6 schematically the circuitry for a channel of a detector system as depicted in FIG. 5, including also a channel status register and a more complex logic to be able to save the gain bits (gbits) in the counter.

FIG. 6 shows the architecture of a dual mode detector system (84) as shown in FIG. 5, but comprising in addition:
a) a channel status register (CSR) 80. The CSR receives control signals from the chip periphery, such that every CSR 80 can be loaded with specific values, and allows every channel to behave differently;
b) a more complex control logic block 40 receiving input from the discriminator 42, the CSR 80, channel signals and chip control signals and providing control signals to the preamplifier feedback network, the shaper feedback network, the switches sw1-sw6, the discriminator trimming circuitry 81 and the counter 52;

c) a trimming circuitry block 81 is added, receiving input from the CSR 80, to fine tune every discriminator 42 in the ASIC.

In an exemplary embodiment the CSR 80 comprises:

a) a set of "trim bits";
b) a "CI" mode bit;
c) a set of "gain bits"; and
d) a bit "DGS off".

The trim bits in (a) are used to fine-tune the channel's discriminator 42 to reduce the channel-to-channel dispersion and increase the detector resolution. The CI mode bit in (b) codes the mode of operation of the channel, so that the channel control logic circuitry 40 can properly configure the switches sw1 to sw6 and the feedback network of the preamplifier (control signals for C2,C3 and preamp reset 43 according to the selected acquisition mode.

As important feature in terms of the flexibility of the photon detector system 64, 84, this measure allows every channel to be independently set to CI or SPC mode depending on the requirements.

The DGS off mode in (d) tells the control circuitry that the dynamic gain switching circuitry has to be disabled. In this case, and if CI mode is set to one (i.e. the channel is configured to work in CI mode), the content of the set of "Gain bits" (c) in the CSR is used to control the gain, i.e. switching in or out C2 and C3 in the preamp feedback network, instead of the signals coming from the discriminator. In case CI mode is set to zero (i.e. the channel is configured to work in SPC mode) the gain bits will also define the preamp gain. In case the incoming signal per channel is known, this allows in CI mode to avoid the use of the DGS circuitry avoiding the additional noise that it adds to the signal. In SPC mode, it allows to further reduce the gain in the case that high-energy photons or particles (like electrons) are used during the experiment. Following the main idea of this invention, the feedback network needed in CI mode with dynamic gain switching can be reused in SPC mode to improve the performance and flexibility of the detector.

In this embodiment the gain bits produced by the control logic 40 and the discriminator 42 are not saved in a set of gain bit latches 48 but in the counter, thus avoiding the latches 48 and the gain bit readout 49, and the corresponding gain bit readout network (see FIG. 9, 105).

Figure 7:
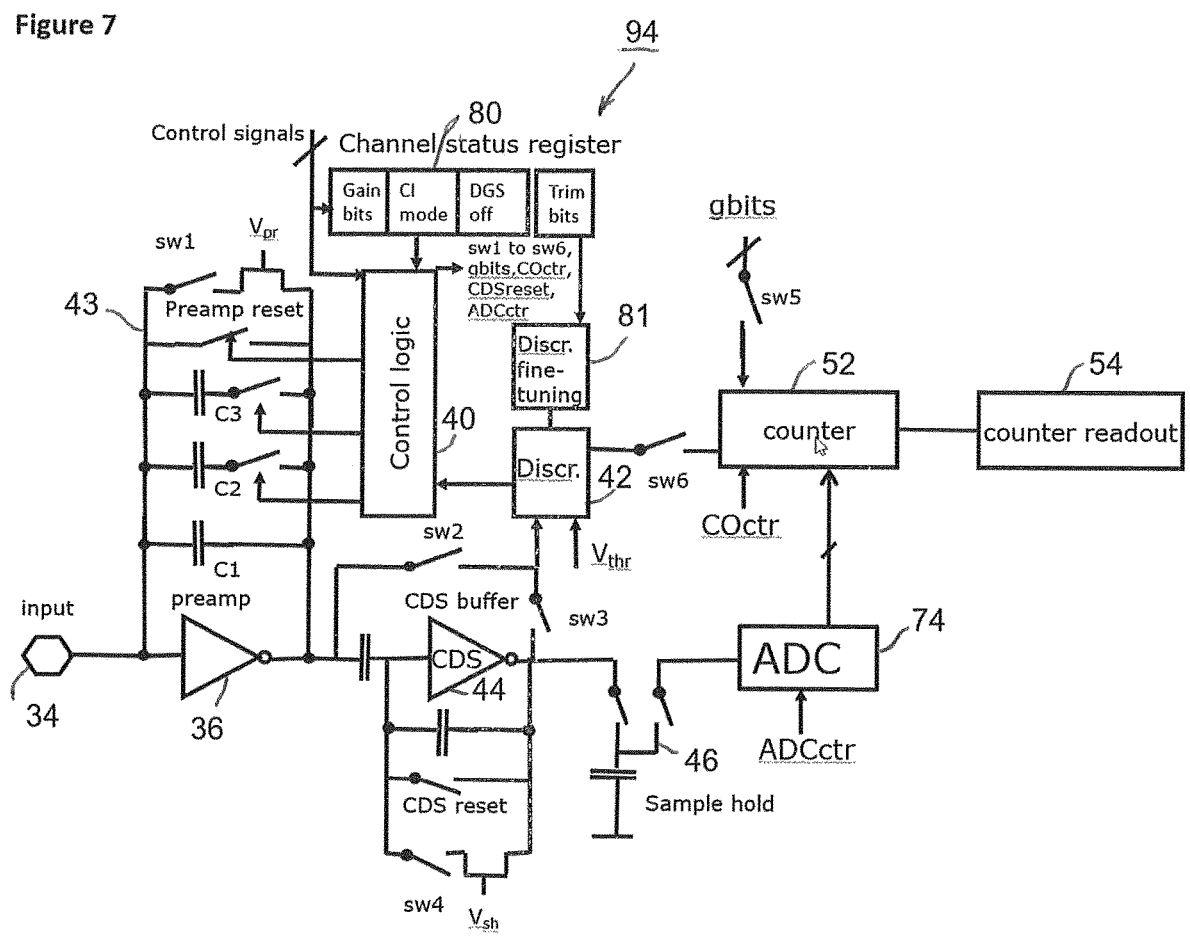
FIG. 7 schematically the circuitry for a channel of a detector system as depicted in FIG. 6, including also an analog to digital converter (ADC) and a more complex logic to be able to save the ADC output bits in the counter.

FIG. 7 shows the same architecture of a dual mode detector system 94 as shown in FIG. 6, comprising in addition an analog to digital converter (ADC) 74 connected at the output of the sample and hold 46. In this way the data transfer from channel to periphery of the dual mode detector and from the dual mode detector to the data acquisition system happens digitally, making the analogue readout 104 unnecessary and removing all possible distortions of the analog signal on- and off-chip. This channel would be characterized in that the content of the ADC is stored in "parallel-in" mode to the counter, so that the ADC content is readout through the counter readout 54 and does not require any additional readout circuitry, neither analog 47 nor digital 49. In this case, only a single digital readout architecture as depicted in FIG. 9 is needed. In this embodiment the control logic has also to control said ADC. Following the same principle, an ADC can similarly be added to the basic readout channel 64.

The invention claimed is:

1. A dual mode detector system for photon detection that is configured for operation either in single photon counting mode or in charge integrating mode with or without gain switching, the detector system comprising:

a) a layer of photosensitive material;
b) an N×M array of photo-detector diodes arranged in said layer of photosensitive material, each of said photo-detector diodes having a bias potential interface connected to a bias potential and a diode output interface;
c) a N×M array of high gain, low noise readout unit cells, one readout unit cell for each photo-detector diode; and
d) each of said readout unit cells having:
   d1) an input interface connecting said diode output interface to a high-gain charge-to-voltage amplifier;
   d2) said high-gain charge-to-voltage amplifier having a feedback network between input and output with:
      d21) a number of feedback capacitors which can be switched in or out from said feedback network;
      d22) a fixed or controllable feedback resistance, using a preamp voltage, which can be switched in or out from said feedback network, as required in the single photon counting mode; and
      d23) a preamp reset switch configured to reset a voltage between terminals of said feedback capacitors to zero in the charge integrating mode;
   d3) said high-gain charge-to-voltage amplifier being connected to a shaper/CDS having a feedback network between input and output, said shaper being configured to amplify and reduce a noise content of a signal coming from a preamplifier in the photon counting mode, and to act as a correlated double sampling stage in the charge integrating mode;
   d4) said shaper having a feedback network between input and output, with:
      d41) a number of feedback capacitors which can be switched in or out from said feedback network;
      d42) a fixed or controllable feedback resistance, needed in single photon counting mode, using a shaper voltage, which can be switched in or out from the feedback network;
      d43) a CDS reset switch, needed to reset a voltage between the terminal of said feedback capacitors to a voltage of zero in the charge integrating mode;
   d5) a discriminator receiving as an input an output voltage of the high-gain charge-to-voltage amplifier in the charge integrating mode and the output of the shaper in the single photon counting mode, thus detecting when the preamplifier reaches saturation in the charge integrating mode or when a photon was impinging on said photo detector diode in the single photon counting mode;
   d6) a counter connected to said discriminator in the single photon counting mode, needed to count the number of photons;
   d7) a number of switches, said switches being controlled to enable a use of said high-gain charge-to-voltage amplifier, said shaper and said discriminator in both modes;
   d8) a control logic, connected to the output of said discriminator and to control signals coming from a chip periphery, generating necessary steering signals for a preamplifier feedback network;
   d9) a counter readout having a required digital circuitry configured to read out said counter;
   d10) a gain bit readout having required digital circuitry to read out the latches for the gain bits; and
   d11) an analog readout having required analog circuitry needed to read out a voltage of a sample-and-hold circuit; and e) a channel readout architecture formed of:
  e1) one or more analog multiplexers connected to the analog readout circuitry of all channels and configured to, according to a channel selection and MUX control signals, route selected channels to one or more analog outputs;
  e2) one or more digital multiplexers connected to the counter readout circuitry of all channels and configured to, according to a channel selection and MUX control signals, route selected channels to one or more digital outputs; and
  e3) one or more digital multiplexers connected to the gain bit readout circuitry of all channels and configured to, according to a channel selection and MUX control signals, route a selected channels to one or more digital outputs.

2. The dual mode detector system according to claim 1, wherein said channel readout architecture comprises:
  a) one or more analog multiplexers connected to the analog readout circuitry of all channels and configured to, according to the channel selection and MUX control signals, route the selected channels to one or more analog to digital converters ADCs;
  b) one or more analog to digital converters connected to said analog multiplexers which digitize the output of the analog readout of one or more channels according to the channel selection and MUX control signals;
  c) wherein the digital outputs of said ADCs are connected to digital multiplexers so that no analog output is present;
  d) one or more digital multiplexers connected to the counter readout circuitry of all channels and to the ADCs and configured to, according to the channel selection and MUX control signals, route the selected channels or the ADC output to one or more digital outputs; and
  e) one or more digital multiplexers connected to the gain bits readout circuitry of all channels and configured to, according to the channel selection and MUX control signals, route the selected channels to one or more digital outputs.

3. The dual mode detector system according to claim 1, wherein:
  an analog to digital converter is connected to the sample-and-hold output and the digital output of said ADC can be latched in said counter and read out through the counter readout circuitry; and
  the analog readout and the corresponding analog readout architecture are not present.

4. A dual mode detector system for photon detection that is configured for operation either in single photon counting mode or in charge integrating mode with or without gain switching, the detector system comprising:
  a) a layer of photosensitive material;
  b) an N×M array of photo-detector diodes arranged in said layer of photosensitive material, each of said photo-detector diodes having a bias potential interface connected to a bias potential and a diode output interface;
  c) a N×M array of high gain, low noise readout unit cells, one readout unit cell for each photo-detector diode; and
  d) each readout unit cell having:
    d1) an input interface connecting said diode output interface to a high-gain charge-to-voltage amplifier;
    d2) said high-gain charge-to-voltage amplifier having a feedback network between input and output comprising:
      d21) a number of feedback capacitors which can be switched in or out from said feedback network;
      d22) a fixed or controllable feedback resistance, using a preamp voltage, which can be switched in or out from said feedback network, needed in single photon counting mode;
      d23) a preamp reset switch, needed to reset the feedback capacitors to a voltage of zero between their terminals in charge integrating mode;
    d3) said high-gain charge-to-voltage amplifier being connected to a shaper/CDS having a feedback network between input and output;
    d4) said shaper having a feedback network between input and output, comprising:
      d41) a number of feedback capacitors which can be switched in or out from said feedback network;
      d42) a fixed or controllable feedback resistance, needed in single photon counting mode, using a shaper voltage, which can be switched in or out from the feedback network;
      d43) a CDS reset switch, needed to reset the feedback capacitors to a voltage of zero between their terminals in charge integrating mode;
    d5) a discriminator trimming circuitry bloc, receiving as an input a set of trim bits and providing needed adjustment biases to the discriminator to reduce channel-to-channel dispersion;
    d6) a discriminator receiving as an input the biases generated by said discriminator trimming circuitry, the output voltage of the high-gain charge-to-voltage amplifier in charge integrating mode and the output of the shaper in single photon counting mode, thus detecting when the preamplifier reaches saturation in charge integrating mode or when a photon was impinging on the photo detector diode in single photon counting mode;
    d7) a counter connected to said discriminator in single photon counting mode, needed to count the number of photons;
    d8) a number of switches, said switches being controlled to enable the use of the high-gain charge-to-voltage amplifier, the shaper and the discriminator in both modes;
    d9) a channel status register receiving control signals from the chip periphery, such that every CSR can be loaded with specific values, and allows every channel to behave differently;
    d10) a control logic receiving input from the CSR and connected to the output of the discriminator and to control signals coming from the chip periphery, generating the necessary steering signals for the preamplifier feedback network, the shaper feedback network, the counter and the discriminator fine tuning;
    d11) a counter readout comprising the required digital circuitry needed to readout said counter;
    d12) an analog readout, comprising the required analog circuitry needed to readout the voltage of said sample and hold circuit; and
  e) a channel readout architecture having:
    e1) one or more analog multiplexers connected to the analog readout circuitry of all channels and configured to, according to the channel selection and MUX control signals, route the selected channels to one or more analog outputs; and
    e2) one or more digital multiplexers being connected to the counter readout circuitry of all channels and configured to, according to the channel selection and MUX control signals, route the selected channels to one or more digital outputs.

5. The dual mode detector system according to claim 4, wherein said channel readout architecture comprises:
 a) one or more analog multiplexers connected to the analog readout circuitry of all channels and configured to, according to the channel selection and MUX control signals, route the selected channels to one or more analog to digital converters ADCs;
 b) one or more analog to digital converters connected to the analog multiplexers which digitize the output of the analog readout of one or more channels according to the channel selection and MUX control signals;
 c) wherein the digital outputs of said ADCs are connected to digital multiplexers so that no analog output is present;
 d) one or more digital multiplexers connected to the counter readout circuitry of all channels and to the ADCs and configured to, according to the channel selection and MUX control signals, route the selected channels or the ADC output to one or more digital outputs; and
 e) one or more digital multiplexers connected to the gain bits readout circuitry of all channels and configured to, according to the channel selection and MUX control signals, route the selected channels to one or more digital outputs.

6. The dual mode detector system according to claim 4, wherein:
 an analog to digital converter is connected to the sample-and-hold output and the digital output of said ADC can be latched in said counter and read out through the counter readout circuitry; and
 the analog readout and the corresponding analog readout architecture are not present.

* * * * *